US009049099B2

United States Patent
Pignataro et al.

(10) Patent No.: US 9,049,099 B2
(45) Date of Patent: *Jun. 2, 2015

(54) LABEL DISTRIBUTION PROTOCOL ADVERTISEMENT OF SERVICES PROVIDED BY APPLICATION NODES

(75) Inventors: Carlos M. Pignataro, Raleigh, NC (US); Cedell Adam Alexander, Jr., Durham, NC (US); Jim Guichard, New Boston, NH (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/850,952

(22) Filed: Aug. 5, 2010

(65) Prior Publication Data

US 2012/0033664 A1 Feb. 9, 2012

(51) Int. Cl.
  *H04L 12/751* (2013.01)
  *H04L 12/723* (2013.01)
  *H04L 12/46* (2006.01)

(52) U.S. Cl.
  CPC .............. *H04L 45/02* (2013.01); *H04L 12/4633* (2013.01); *H04L 45/507* (2013.01)

(58) Field of Classification Search
  CPC ............................... H04L 45/02; H04L 45/507
  USPC ...................... 370/329, 341, 431, 437, 395.2; 709/202–204, 206, 217, 219, 230
  See application file for complete search history.

(56) References Cited

U.S. PATENT DOCUMENTS

| | | | |
|---|---|---|---|
| 7,243,155 B2 * | 7/2007 | Bou-Ghannam et al. | 709/230 |
| 7,254,136 B1 * | 8/2007 | Gunter et al. | 370/401 |
| 7,711,780 B1 * | 5/2010 | Durand et al. | 709/206 |
| 7,742,431 B2 * | 6/2010 | Ng et al. | 370/254 |
| 7,860,100 B2 | 12/2010 | Khalid et al. | |
| 8,345,682 B2 | 1/2013 | Pignataro et al. | |
| 8,467,411 B1 * | 6/2013 | Minei et al. | 370/467 |
| 2002/0143944 A1 * | 10/2002 | Traversat et al. | 709/225 |
| 2002/0159463 A1 * | 10/2002 | Wang | 370/401 |
| 2003/0084177 A1 * | 5/2003 | Mulligan | 709/230 |
| 2004/0165605 A1 * | 8/2004 | Nassar | 370/401 |
| 2005/0262232 A1 * | 11/2005 | Cuervo et al. | 709/223 |
| 2006/0233155 A1 * | 10/2006 | Srivastava | 370/351 |
| 2007/0237147 A1 | 10/2007 | Quinn et al. | |
| 2008/0177896 A1 * | 7/2008 | Quinn et al. | 709/238 |
| 2008/0198849 A1 | 8/2008 | Guichard et al. | |
| 2008/0320303 A1 | 12/2008 | Khalid et al. | |
| 2009/0037713 A1 | 2/2009 | Khalid et al. | |
| 2009/0122724 A1 * | 5/2009 | Rosenberg | 370/255 |
| 2010/0058329 A1 | 3/2010 | Durazzo et al. | |
| 2010/0061301 A1 * | 3/2010 | Antal et al. | 370/328 |

(Continued)

*Primary Examiner* — Hassan Phillips
*Assistant Examiner* — Saba Tsegaye
(74) *Attorney, Agent, or Firm* — The Law Office of Kirk D. Williams

(57) ABSTRACT

An application node advertises service(s), using a label distribution protocol, that it offers to other network nodes and a corresponding label to use to identify these services(s). For example, a Targeted Label Distribution Protocol (tLDP) session may be established between a packet switching device and the application node providing these services to communicate the advertisement. Packets are encapsulated and sent from a service node (e.g., packet switching device) with the corresponding label to have one or more advertised services applied to the packet by an application node (e.g., a packet switching device and/or computing platform such as a Cisco ASR 1000).

14 Claims, 9 Drawing Sheets

(56) References Cited

U.S. PATENT DOCUMENTS

| | | |
|---|---|---|
| 2010/0165985 A1 | 7/2010 | Sharma et al. |
| 2010/0191595 A1* | 7/2010 | Graves et al. .............. 705/14.36 |
| 2010/0254385 A1 | 10/2010 | Sharma et al. |
| 2010/0302973 A1* | 12/2010 | Lange et al. .................. 370/254 |
| 2011/0096780 A1* | 4/2011 | Darwish ....................... 370/392 |
| 2012/0002672 A1 | 1/2012 | Alexander, Jr. et al. |
| 2012/0026897 A1 | 2/2012 | Guichard et al. |
| 2012/0027016 A1 | 2/2012 | Filsfils et al. |
| 2012/0033663 A1 | 2/2012 | Guichard et al. |
| 2012/0275461 A1* | 11/2012 | Chen et al. ................. 370/395.5 |

\* cited by examiner

US 9,049,099 B2

LABEL DISTRIBUTION PROTOCOL ADVERTISEMENT OF SERVICES PROVIDED BY APPLICATION NODES

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Layer-4 to layer-7 services are often applied to packets being sent through a packet switching device. Service Insertion Architecture teaches one approach to providing network services outside the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
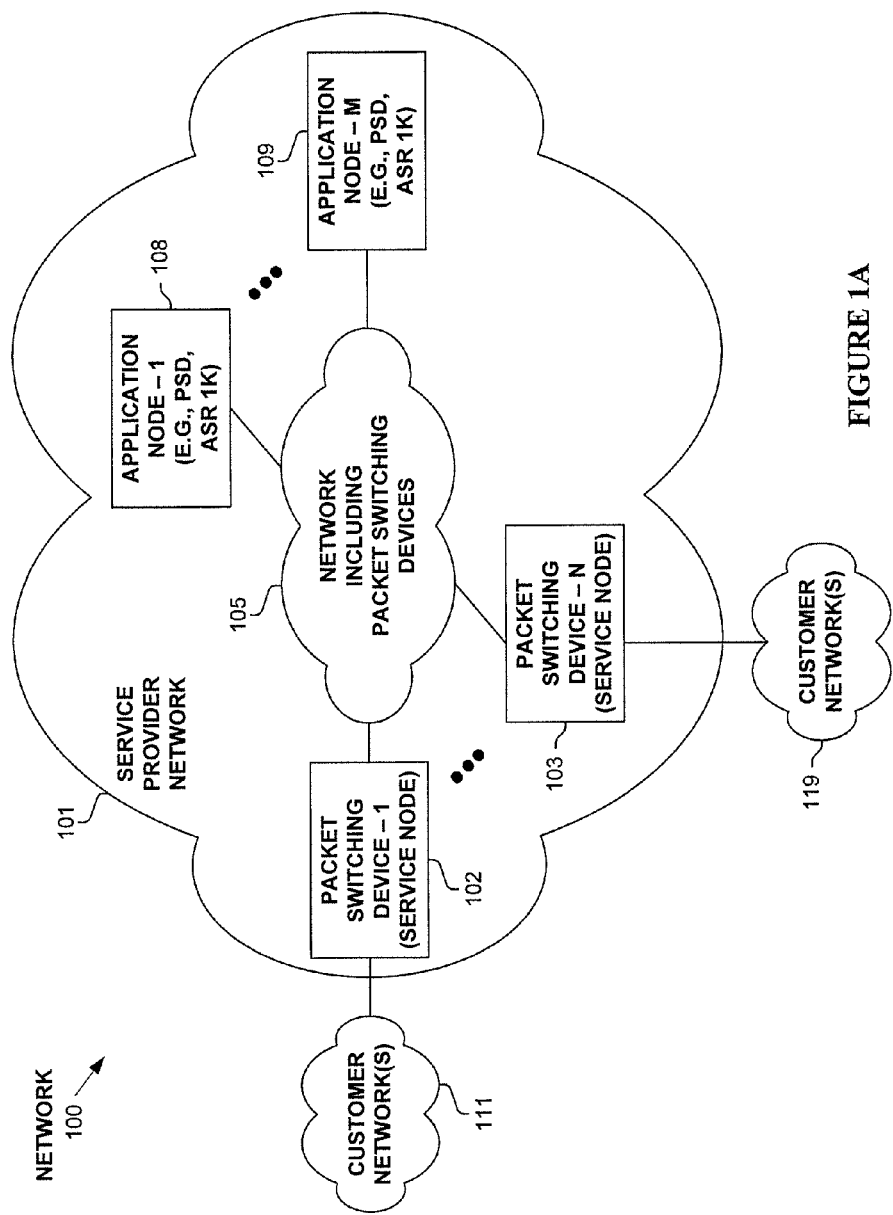
FIG. 1A illustrates a network operating according to one embodiment.

Disclosed are, inter alia, methods, apparatus, computer-storage media, mechanisms, and means associated with an application node (e.g., a packet switching device and/or computing platform such as a Cisco ASR 1000) advertising, using a label distribution protocol, one or more services that it offers to other network nodes. Other application nodes or service nodes (e.g., packet switching devices) thus discover the capability of the application node, as well as typically receiving a label to include in request packets for using one or more of these services, and possibly receiving state information describing the service(s) and/or their current state of availability. Based on the advertisement, other application nodes or service nodes can correspondingly send packets to the application node for application of its service(s) to these packets. In one embodiment, Label Distribution Protocol (LDP) is used. In one embodiment, a Targeted Label Distribution Protocol (tLDP) session between the application node and the service-requesting network node is used to communicate the advertisement of the service(s). In one embodiment, a Forwarding Equivalence Class (FEC) value representing one or more services is associated with the particular label in order to identify to use the particular label in requesting these one or more services.

Examples of these services applied to packets in one embodiment include at least one application from a group of applications consisting of: layer-4, layer-5, layer-6, and layer-7 services. In one embodiment, the service includes at least one application from a group of applications consisting of: Firewall (FW), Network Address Translation (NAT), Network-based Application Recognition (NBAR), deep packet inspection (DPI), authentication, encryption, and Internet Protocol Security (IPsec). In one embodiment, a service might include multiple services/applications applied by one or more application nodes (which may be referred to as a single service including multiple services/applications, or multiple services/applications).

One embodiment includes a method, comprising: advertising, via a label distribution protocol by an application node, that the application node is configured to perform one or more services; receiving, by a packet switching device, one or more packets including information being distributed via the label distribution protocol, with said one or more packets including a particular advertisement that the application node is configured to perform said one or more services; selecting the application node to apply a particular service based on the particular advertisement; sending, by the packet switching device, a request packet to the application node requesting the application of the particular service to a particular packet; and applying, by the application node, the particular service to the particular packet. Note, one embodiment includes only the functionality performed by the application node; while one embodiment includes only the functionality performed by a service node or other packet switching device.

In one embodiment, the particular advertisement includes a particular label associated with the particular service; and the request packet said sent to the application node includes the particular label. In one embodiment, the request packet includes a label stack comprising a plurality of labels, with the plurality of labels including the particular label. In one embodiment, the request packet includes the particular packet. In one embodiment, the particular service includes at least one application from a group of applications consisting of: layer-4, layer-5, layer-6, and layer-7 services. In one embodiment, the particular service includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

One embodiment includes establishing a Targeted Label Distribution Protocol (tLDP) session between the application node and the packet switching device, such that the particular label is communicated to the packet switching device from the application node over the tLDP session. In one embodiment, the particular advertisement includes a particular label associated with said one or more services, and the request packet said sent to the application node includes the particular label. In one embodiment, the request packet includes one or more non-label service identification values based on which the particular service can be identified by the application node.

2. Description

Disclosed are, inter alia, methods, apparatus, computer-storage media, mechanisms, and means associated with an application node (e.g., a packet switching device and/or computing platform such as a Cisco ASR 1000) advertising, using a label distribution protocol, one or more services that it offers to other network nodes. Such advertisements allow other application nodes or service nodes (e.g., packet switching devices) to discover the capabilities of the application node, as well as typically receiving corresponding labels to include in request packets for using one or more of these services, and possibly receiving state information describing the service(s) and/or their current state of availability. In one embodiment, Label Distribution Protocol (LDP) is used. In one embodiment, a Targeted Label Distribution Protocol (tLDP) session between the application node and the service-requesting network node is used to communicate the advertisement of the service(s). In one embodiment, a Forwarding Equivalence Class (FEC) value representing one or more services is associated with the particular label in order to identify to use the particular label in requesting these one or more services. Note, a FEC is a group of packets that have the same forwarding behavior.

Examples of these services applied to packets in one embodiment include at least one application from a group of applications consisting of: layer-4, layer-5, layer-6, and layer-7 services. In one embodiment, the service includes at least one application from a group of applications consisting of: Firewall (FW), Network Address Translation (NAT), Network-based Application Recognition (NBAR), deep packet inspection (DPI), authentication, encryption, and Internet Protocol Security (IPsec). In one embodiment, a service might include multiple services/applications applied by one or more application nodes (which may be referred to as a single service including multiple services/applications, or multiple services/applications). Additionally, in one embodiment, a service node, or an application node as part of a service which includes multiple applications/services applied by multiple application nodes, might provide parameters or attributes to refine the service being advertised, with these parameters or attributes possibly being communicated to the application node prior to applying a service to a packet, or possibly included with the packet to which the service is to be applied. For example, a generalized deep packet inspection service will need to be configured for what pattern or signature to locate. In one embodiment, an application node might advertise a specific service which may not require such parameters or arguments; for example, a deep packet inspection service configured to look for a predefined, particular pattern or signature.

Note, the nouns "service" and "application" are used interchangeably herein. Further note: a particular packet having one or more services applied to it by an application node is referred to herein as a services-applied packet, regardless of whether the application of the service(s) resulted in the same particular packet, a modified particular packet, or a different packet. Further, "ServiceWire" is a term used herein to refer to the technology (e.g., equipment, methods, protocols) used in communicating packets to and/or among one or more remote application node(s), the application of one or more services to a packet, and possibly the sending of the services-applied packet and/or other results to a ServiceWire-capable service node. For example, the packet encapsulation or information sent between service node(s) and/or application node(s) might be referred to as ServiceWire encapsulation or ServiceWire attributes. Additionally, the term "advertise," especially in regards to the advertisement of a service, means to send information, typically in one or more packets, concerning one or more services. This advertisement allows the discovery of one or more services by another device; may include signaling information such as a label for accessing these one or more services; and/or may include state or description information, such as that the service is currently unavailable or information describing the service or parameters or attributes.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device. The term "packet" refers to a data packet or frame, such as, but not limited to, an Internet Protocol (IP) packet or Ethernet frame; and the format of a packet includes at least a packet header and payload.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1A illustrates network 100 operating according to one embodiment, wherein a service node (e.g., edge packet switching device 102-103) sends a packet to an application node (108-109) for performing one or more services to the packet by one or more application nodes (108-109). Network 100 illustrates a typical configuration of a service provider network 101, which has edge packet switching devices 102-103 communicatively coupled to customer networks 111-119; and within service provider network 101, service provider nodes 102-103 and 108-109 are communicatively coupled (105).

Note, one embodiment performs the operations of advertising services and sending packets to application node(s) for applying service(s) in one or more networks different than network 100; and one embodiment performs the operations of advertising services and receiving packets by application node(s) for applying service(s) in one or more networks different than network 100.

As illustrated in FIG. 1A, application nodes 108-109 are configured for advertising their services via a label distribution protocol, such as, but not limited to, Label Distribution Protocol (LDP). Packet switching devices 102-103 and 108-109 are configured to receive these advertisements sent from a different network node. In one embodiment, this advertisement of the service(s) allows the discovery, by other packet switching devices 102-103 and 108-109, of the service(s) provided by application nodes 108-109. In one embodiment, this advertisement includes signaling information, such as a label, for accessing one or more of these service(s). In one embodiment his advertisement includes state and/or descriptive information related to these service(s).

Additionally, packet switching devices 102-103 ("service nodes") are configured for sending packets to one or more application nodes 108-109 for applying one or more discovered services to these packets. Thus, in one embodiment, packet switching devices 102-103 are not required to be able to perform such service(s). This allows the development of new packet services which are performed by an application node 108-109, without having to integrate into a packet switching device 102-103 (which would typically be more costly in terms of development and testing). Examples of these services applied to packets in one embodiment include layer-4, layer-5, layer-6, and/or layer-7 services, such as, but not limited to, Firewall (FW), Network Address Translation (NAT), Network-based Application Recognition (NBAR), deep packet inspection (DPI), authentication, encryption, and Internet Protocol Security (IPsec). In one embodiment, a packet that has had services applied to it by an application node 108-109 is returned to the service node 102-103 that originally sent the request packet to the application node 108-109. In one embodiment, a packet that has had services applied to it by an application node 108-109 is sent from network 101 without returning to the service node 102-103 that originally sent the request packet to the application node 108-109.

Further, it is possible for an application node (108-109) to apply services to one or more of the packets in a packet flow in order to generate a result, with this result then used by a packet switching device (102-103) in processing these and/or other packets in the packet flow. Thus, in one embodiment, only one or possibly a few packets of a flow (e.g., some, but not all packets) are sent to an application node (108-109) to generate a result or results, with these result(s) used in processing other packets in the packet flow.

In one embodiment, the services applied to a packet include a classification service to classify the packet, possibly using deep packet inspection (DPI), such as, but not limited to, analyzing the payload of the particular packet, and/or analyzing information, extracted from the packet, corresponding to at least one or more of Open System Interconnect (OSI) layer from the group consisting of layer 5, layer 6 and layer 7. In one embodiment, this classification result is used in processing other packets in a flow of packets to which the classified packet belongs. In one embodiment, this classification or other processing result is used in applying Quality of Service (QoS) to one or more packets of the corresponding packet flow.

Figure 1B:
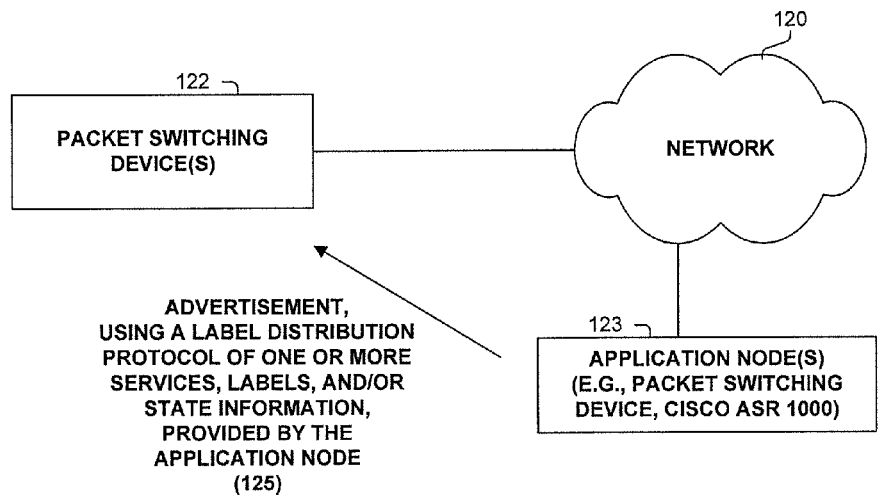
FIG. 1B illustrates a network operating according to one embodiment.

FIG. 1B is a generalized configuration of one embodiment illustrating the discovery of services that application node(s) 123 are capable of applying to packets. In one embodiment, application node(s) 123 advertise (125) their service(s) via a label distribution protocol, such as, but not limited to, Label Distribution Protocol (LDP) over network 120 to packet switching device(s) 122 (which can be configured as a service or application node in one embodiment). In one embodiment, this advertisement includes signaling information, such as a label, for accessing one or more of these service(s). In one embodiment his advertisement includes state and/or descriptive information related to these service(s).

Figure 1C:
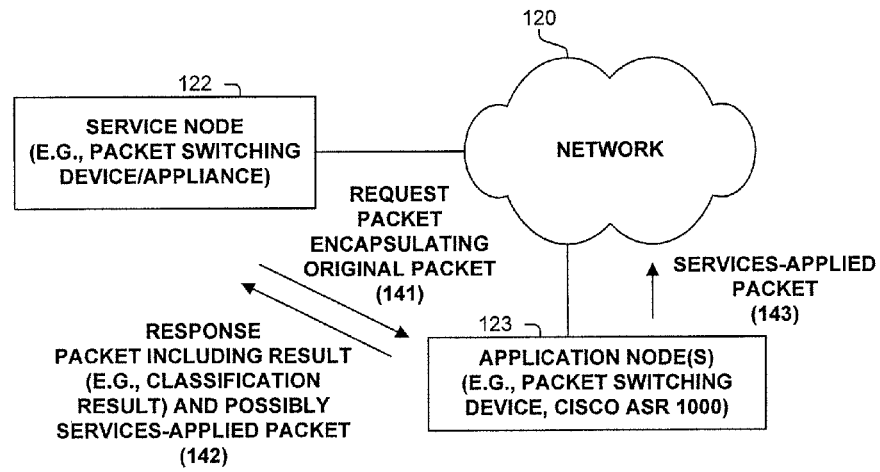
FIG. 1C illustrates a network operating according to one embodiment.

Next, shown in FIG. 1C is a generalized configuration of one embodiment including service node 122 (e.g., packet switching device/appliance), application node(s) 123 (e.g., packet switching device/appliance such as, but not limited to, a Cisco ASR 1000), communicatively coupled via network 120. As shown, service node 122 sends a request packet (141) encapsulating an original packet to application node(s) 123, which applies one or more services to the original packet to possibly determine a result (e.g., classification or other result) and resulting in a services-applied packet. In one embodiment, a response packet is sent (142) from application node(s) 123 to originating service node 122, with the response packet including the determined result, and possibly the encapsulated services-applied packet (e.g., the result of one or more services being applied to the original packet, which is typically the same, or a modification of, the original packet). In one embodiment, the services-applied packet is sent (143) into network 120, such as to another packet switching device towards its destination or directly to its destination.

Figure 1D:
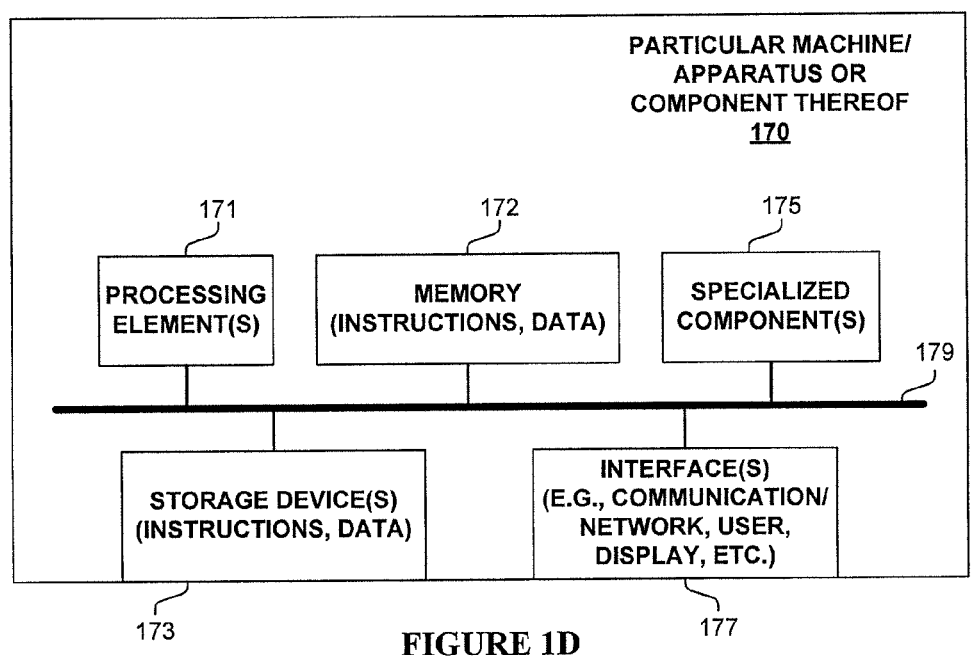
FIG. 1D illustrates an apparatus or component used in one embodiment.

FIG. 1D is a block diagram of an apparatus or component 170 used in one embodiment associated with a service node (e.g., packet switching device) using one or more services applied to packets by an application node (e.g., a packet switching device and/or computing platform). In one embodiment, apparatus or component 170 performs one or more processes corresponding to one of the flow diagrams illustrated or otherwise described herein.

In one embodiment, apparatus or component 170 includes one or more processing element(s) 171, memory 172, storage device(s) 173, specialized component(s) 175 (e.g., optimized hardware such as for performing operations, etc.), and interface(s) 177 for communicating information (e.g., sending and receiving packets, user-interfaces, displaying information, etc.), which are typically communicatively coupled via one or more communications mechanisms 179, with the communications paths typically tailored to meet the needs of the application. In one embodiment apparatus or component 170 corresponds to, or is part of, a service or application node illustrated in one of the other figures or otherwise described herein.

Various embodiments of apparatus or component 170 may include more or less elements. The operation of apparatus or component 170 is typically controlled by processing element(s) 171 using memory 172 and storage device(s) 173 to perform one or more tasks or processes. Memory 172 is one type of computer-readable/computer-storage medium, and typically comprises random access memory (RAM), read only memory (ROM), flash memory, integrated circuits, and/or other memory components. Memory 172 typically stores computer-executable instructions to be executed by processing element(s) 171 and/or data which is manipulated by processing element(s) 171 for implementing functionality in accordance with an embodiment. Storage device(s) 173 are another type of computer-readable medium, and typically comprise solid state storage media, disk drives, diskettes, networked services, tape drives, and other storage devices. Storage device(s) 173 typically store computer-executable instructions to be executed by processing element(s) 171 and/or data which is manipulated by processing element(s) 171 for implementing functionality in accordance with an embodiment.

Figure 2A:
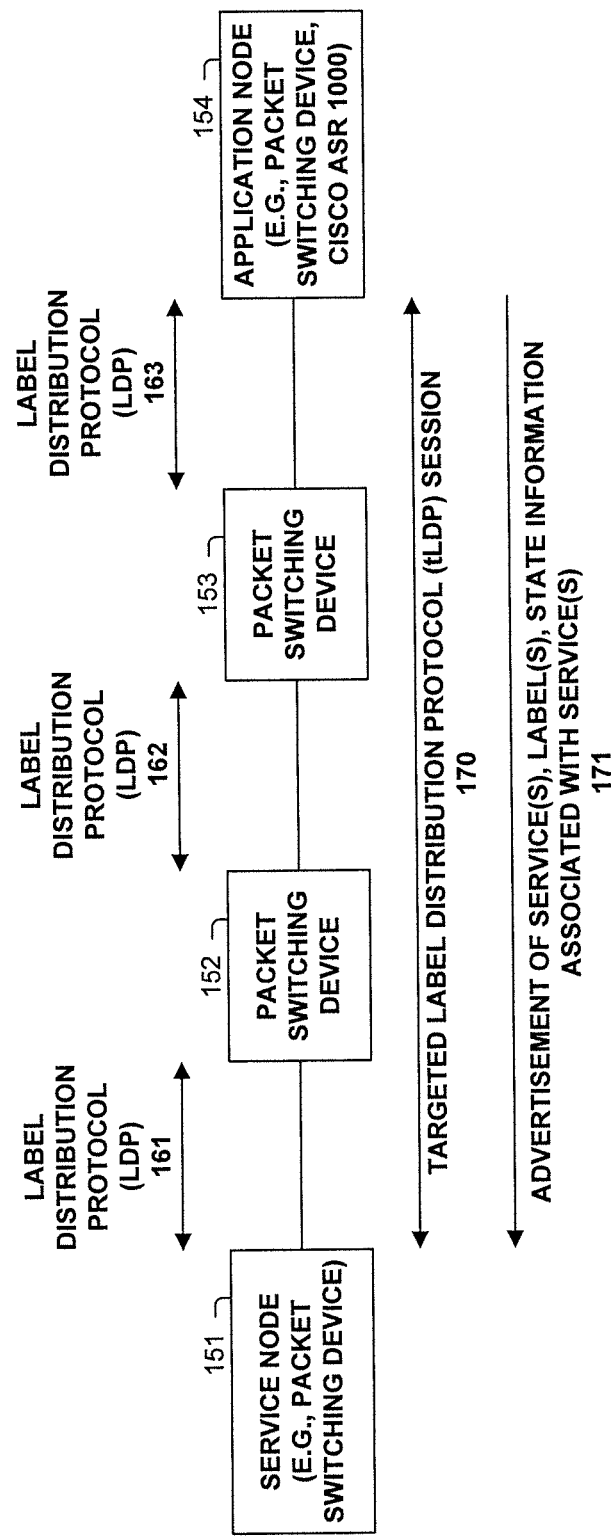
FIG. 2A illustrates a network operating according to one embodiment.

FIG. 2A illustrates a network operating according to one embodiment using Label Distribution Protocol (LDP) to advertise one or more services available from an application node 154. Shown in FIG. 2A are network nodes: service node 151 (e.g., a packet switching device); intermediary packet switching devices 152-153 (e.g., a typically network configuration wherein service and application nodes are not directly connected); and application node 154 (e.g., a packet switching device, Cisco ASR 1000). LDP sessions 161-163 are run between nodes (e.g., operating according to Multiprotocol Label Switching (MPLS) as shown. A targeted Label Distribution Protocol (tLDP) session is established between an application node 154 and 151, over which application node 154 advertises one or more services (e.g., Layer-2 to Layer-7 service) that it can apply to packets.

Figure 3A:
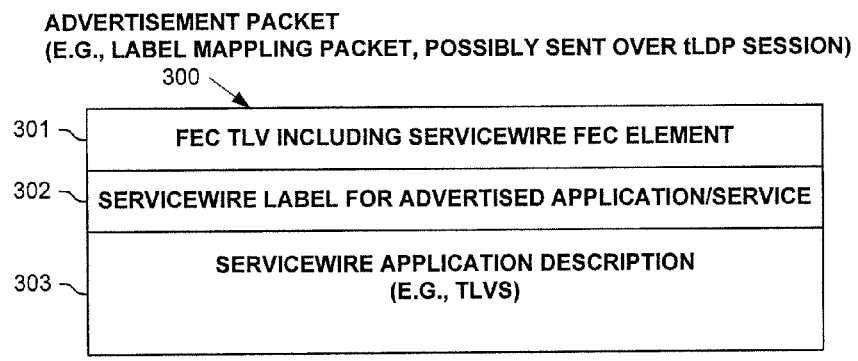
FIG. 3A illustrates a packet format used in one embodiment.

Briefly turning to FIG. 3A, illustrated are fields 300 of a packet of a label distribution protocol (e.g., a label mapping packet) used for advertising one or more services in one embodiment. As shown, these fields include:

a Forward Equivalence Class (FEC) type-length-value element (TLV) 301, including a FEC element (e.g., termed ServiceWire FEC element) used to identify that this advertisement is for one or more applications;

a label 302 (e.g., termed ServiceWire label) to be used in request packets to identify that one or more of these one or more advertised services are to be applied to a packet; and optionally, but typically, a description of the service(s) 303 (e.g., termed ServiceWire application description) available, such as in a format of one or more TLVs. For example, this field might be used to identify that the service is a generic firewall which parameters will typically need to be supplied in a request packet; or a specific firewall, such as inside-to-outside network or outside-to-inside network.

Thus, fields 300 transported via a label distribution protocol advertise one or more available services from an application node, and provide a particular label (e.g., in label field 302) to use in a request packet to identify the one or more requested services to be applied to a packet.

For example, in one embodiment, an application node advertises (e.g., in an advertisement packet 300) a particular label to be included in a request packet for which a corresponding particular service is to be applied by the application node. In one embodiment, an application node advertises a particular label to be included in a request packet for to access any of the services that the application node provides. In such case, the request packet typically includes one or more non-label identification values (e.g., a ServiceWire Service Identification TLV) which identifies one or more particular services to be applied by the application node.

Figure 2B:
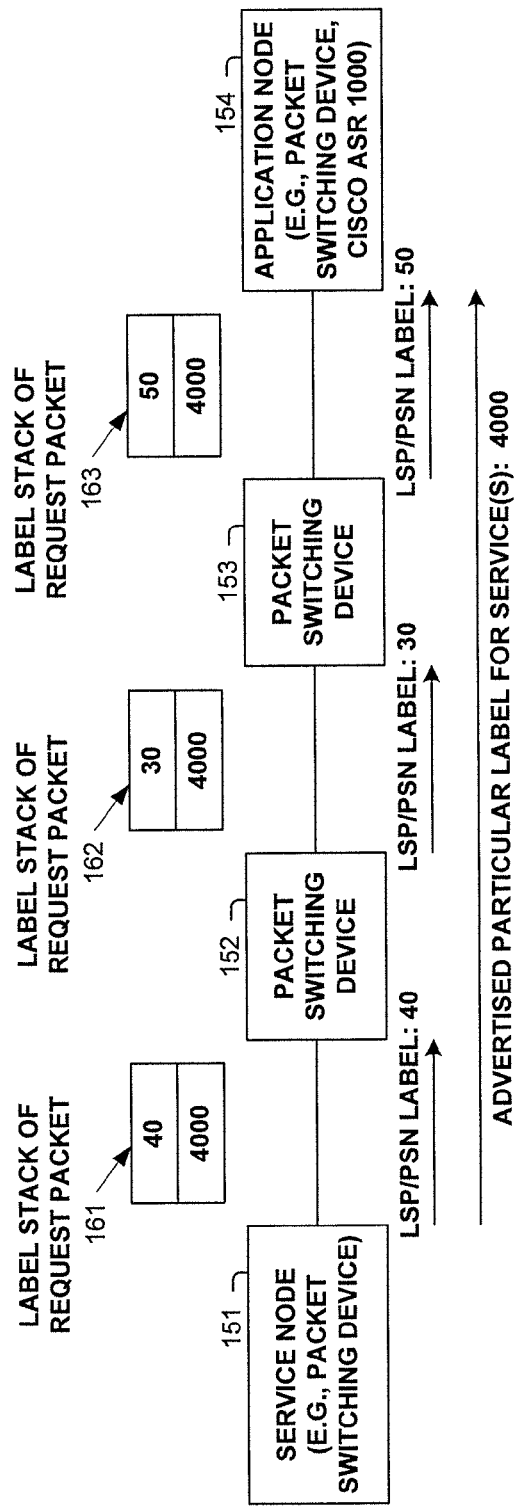
FIG. 2B illustrates a network operating according to one embodiment.

FIG. 2B continues the example discussed in relation to FIG. 2A, with the addition of values of labels shown for communicating packets over a label switched path (LSP) from service node 151 to application node 154. As shown, service node 151 uses packet-switched network (PSN) label 40; packet switching device 152 uses PSN label 30; and packet switching device 153 uses PSN label 50. Further shown is that label 4000 has been advertised, using a label distribution protocol, to be used to access one or more services provided by application node 154. In one embodiment, label 4000 represents a particular service to be applied to a packet. In one embodiment, label 4000 represents multiple services, with the particular service to be applied to a packet determined based on other information, such as, but not limited to a ServiceWire Service Identification value (e.g., in a TLV).

Thus, the corresponding label stacks 161-163 are illustrated that will be used in a label stack of a request packet, being transported from service node 151 to application node 154, and requesting the corresponding services be applied to a particular packet (typically encapsulated in the request packet) by application node 154. Upon receipt of the packet, Application node 154 identifies that the one or more services corresponding to label 4000 (e.g., the last label in the label stack) are to be applied to the particular packet.

Figure 3B:
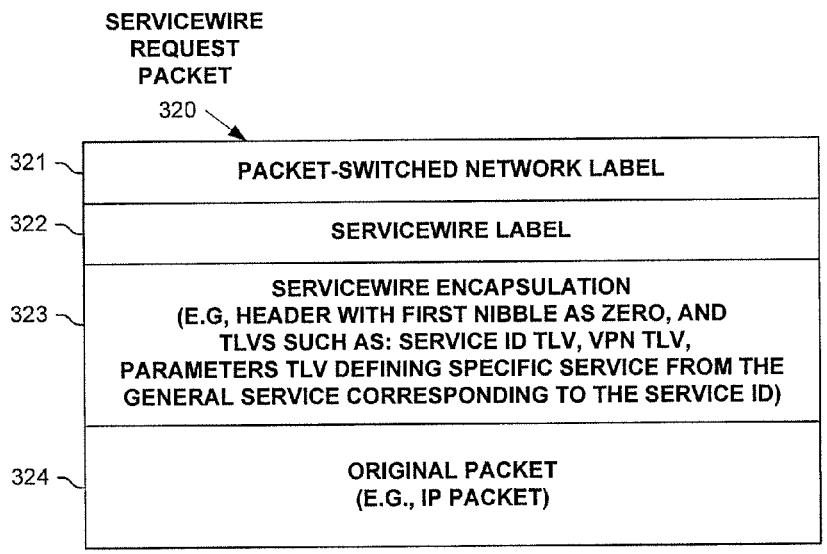
FIG. 3B illustrates a packet format used in one embodiment.

Briefly turning to FIG. 3B, illustrated are fields 320 of a request packet used for advertising requesting the application of one or more services to a particular packet in one embodiment. As shown, these fields include:

a packet-switched network (PSN) label 321 (e.g., labels of values 40, 30 and 50 in the example of FIG. 2B);

a label 322 (termed ServiceWire label) used to identify the one or more services to be applied to a particular packet, with the value of label 322 being that advertised by a label distribution protocol (e.g., label 4000 in the example of FIG. 2B);

optional parameters or attributes 323 (termed ServiceWire encapsulation) for use in defining and/or applying the service(s) corresponding to the value in label field 322; and typically the particular packet 324 to which the service(s) are to be applied.

Thus, fields 320, including label 322 advertised via a label distribution protocol by a particular application node, are included in a request packet to the particular application node. Based on the value of label 322, the particular application node can identify that one or more services are to be applied to the particular packet (typically encapsulated in field 324 of the request packet). In one embodiment, label 322 represents a particular service to be applied to a packet. In one embodiment, label 322 represents multiple services, with the particular service to be applied to a packet determined based on other information, such as, but not limited to a ServiceWire Service Identification value (e.g., in a TLV included in field 323).

Figure 4:
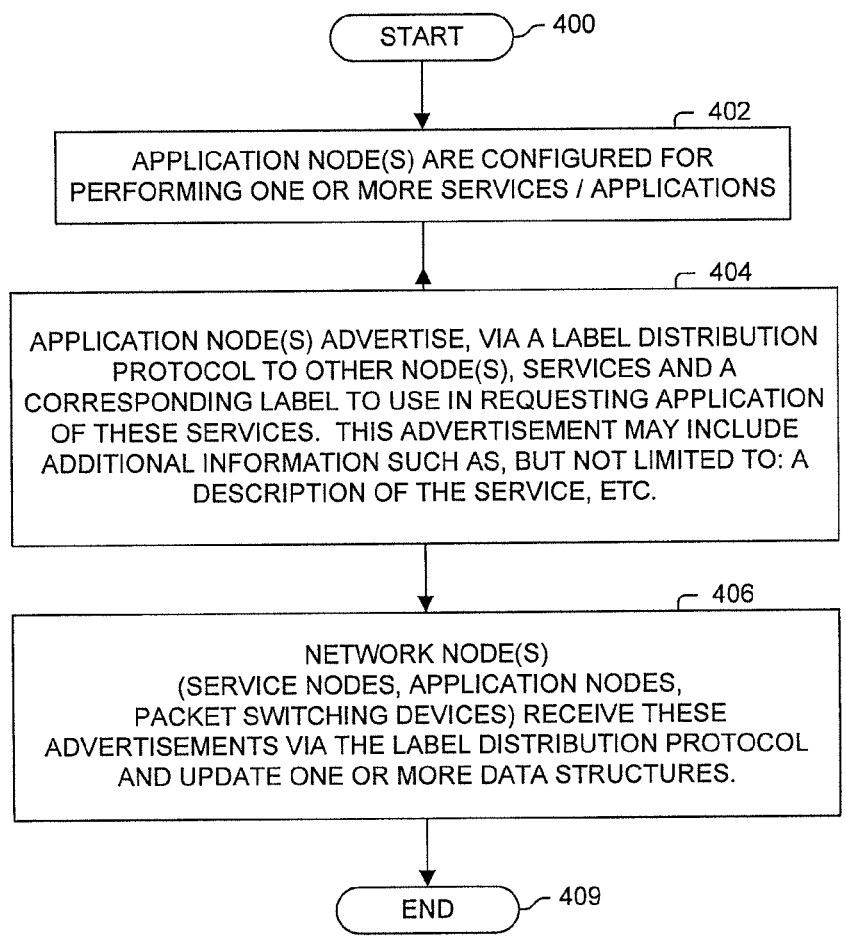
FIG. 4 illustrates a process performed in one embodiment.

FIG. 4 illustrates a process performed in one embodiment. Processing begins with process block 400. In process block 402, one or more application nodes are configured for performing one or more services/applications. Examples of these services applied to packets in one embodiment includes at least one application from a group of applications consisting of: layer-4, layer-5, layer-6, and layer-7 services. In one embodiment, the service includes at least one application from a group of applications consisting of: Firewall (FW), Network Address Translation (NAT), Network-based Application Recognition (NBAR), deep packet inspection (DPI), authentication, encryption, and Internet Protocol Security (IPsec). In one embodiment, a service might include multiple services/applications applied by one or more application nodes (which may be referred to as a single service including multiple services/applications, or multiple services/applications).

Additionally, in one embodiment, a service node, or application node (e.g., configuring another application node as part of a service which includes multiple applications/services applied by multiple application nodes), might provide parameters or attributes to refine an advertised service to be performed by a particular application node. These parameters or attributes may be communicated to an application node prior to applying a service to a packet, or possibly be included with the packet to which the service is to be applied. For example, a generalized deep packet inspection service will need to be configured for what pattern or signature to locate. In one embodiment, an application node might advertise a specific service which may not require such parameters or arguments; for example, a deep packet inspection service configured to look for a particular pattern or signature.

In process block 404, application node(s) advertise their services/applications and corresponding label(s) via a label distribution protocol, such as, but not limited to, Label Distribution Protocol (LDP) to other network nodes (e.g., packet switching devices, which includes service node(s) and possibly application node(s)). This advertisement allows the discovery of one or more services by another device; may include signaling information such as a label for accessing these one or more services; and/or may include state or description information, such as that the service is currently unavailable or information describing the service or parameters or attributes. In process block 406, the network node(s) (e.g., service node(s), or other application node(s)) receive these advertisement(s), and update one or more data structures. Processing of the flow diagram of FIG. 4 is complete as indicated by process block 409.

Figure 5:
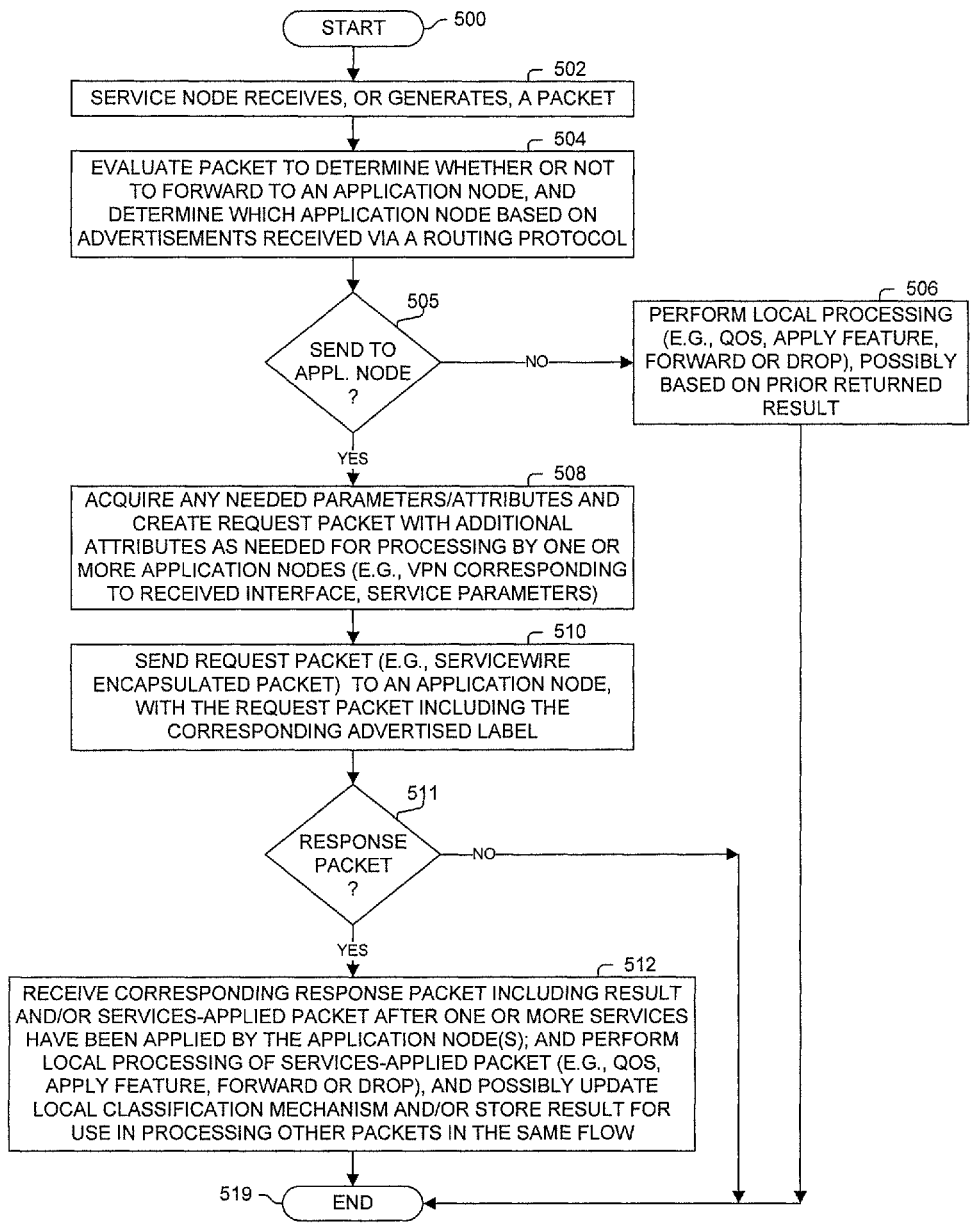
FIG. 5 illustrates a process performed in one embodiment.

FIG. 5 illustrates a process performed in one embodiment by a service node, such as, but not limited to, a packet switching device. Processing begins with process block 500. In process block 502, the service node receives or generates a packet. For example, the packet may be generated by the service node itself, or even by processing of another packet. In process block 504 (assuming it is not already known that the packet should be sent to an application node, e.g., based on a generated packet or all packets being sent to an application node), the packet is evaluated to determine whether or not it should be sent to an application node, as well as to determine which application node based on advertisement(s) received via a label distribution protocol (e.g., by checking a data structure/storage media maintaining received advertisements).

Process block 505 identifies whether or not to send the packet to an application node. In one embodiment, a packet classification mechanism (e.g., binary or ternary content-addressable memory, lookup engine) is used to determine whether or not to forward the packet to an application node, as well as to determine which application node(s) to use for applying the service.

In one embodiment, this classification mechanism is updated in response to a result returned from an application node's processing of another packet in the same packet flow, so that only one or a small number of packets of a flow may be sent to an application node for processing. This may be particularly useful when an application node is performing a classification operation (e.g., for QoS, or even virus or intrusion protection), that after such classification operation is determined for the flow of packets (e.g., based on a subset of the flow of packets), the other packets in the flow of packets are not sent to an application node for processing as how to process these packets has been determined. Thus, the packet classification mechanism may be updated to stop sending packets of the packet flow to an application node.

As identified in process block 505, if the packet should not be sent to an application node, then in process block 506, normal local processing of the packet is performed (e.g., QoS processing, apply one or more features, forward or drop, etc.), possibly based on a result from processing by an application node of one or more packets in a same packet flow.

Otherwise processing proceeds to process block 508, as process block 505 identified that the packet is to be sent to an application node for applying one or more classifications of Layer-4 to Layer-7 services by one or more application nodes to the packet to determine a result. Note, the use of the phrase "applying one or more services to the packet" includes a series of applications applied to the packet, with the packet possibly being modified between the application of some of these services such that one or more of the services is applied to a modified original packet. Further, examples of these Layer-4 to Layer-7 services include, but are not limited to, Firewall (FW), Network Address Translation (NAT), Network-based Application Recognition (NBAR), deep packet inspection (DPI), authentication, encryption, and Internet Protocol Security (IPsec).

In process block 508, any parameters (e.g., VPN identification, specialized service parameters, label stacks, etc.) are acquired, and the request packet is created. The request packet includes the original packet, the corresponding label received in an advertisement via a label distribution protocol, and possibly other ServiceWire attributes. Next, in process block 510, the request packet (e.g., a ServiceWire packet encapsulating the original packet) is sent to an application node with the label (corresponding to the one or more services) included in the request packet, and typically in a label stack of the request packet. As determined in process block 511, if a response packet is expected, then in process block 512, a response packet, corresponding to the sent request packet, is received, with the response packet including a result of the application of one or more services and/or the services-applied packet. In one embodiment, this result is a classification result based on one or more classification operations performed on the original packet. Additionally, typically the result packet also encapsulates the services-applied packet corresponding to the original packet (i.e., the result of one or more services being applied to the original packet by one or more application nodes). In process block 516, the service node processes the services-applied packet, possibly based on the result (e.g., classification result such as a QoS indication for processing one or more packets of a flow of packets), if included in the response packet. Examples of such processing include, but are not limited to: the service node applies QoS to one or more packets of a flow of packets, the service node applies one or more additional services to the services-applied packet; the service node forwards or drops the services-applied packet; the service node performs a lookup operation in the corresponding forwarding information for the VPN identified in the response packet from multiple sets of forwarding information maintained for different VPNs; repeat the process illustrated in FIG. 5 by returning to process block 504, etc. Additionally, as discussed supra, the classification mechanism (e.g., the processing by process block 505) might be updated to no longer send packets of a same packet flow to an application node. Processing of the flow diagram of FIG. 5 is complete as represented by process block 519.

Figure 6:
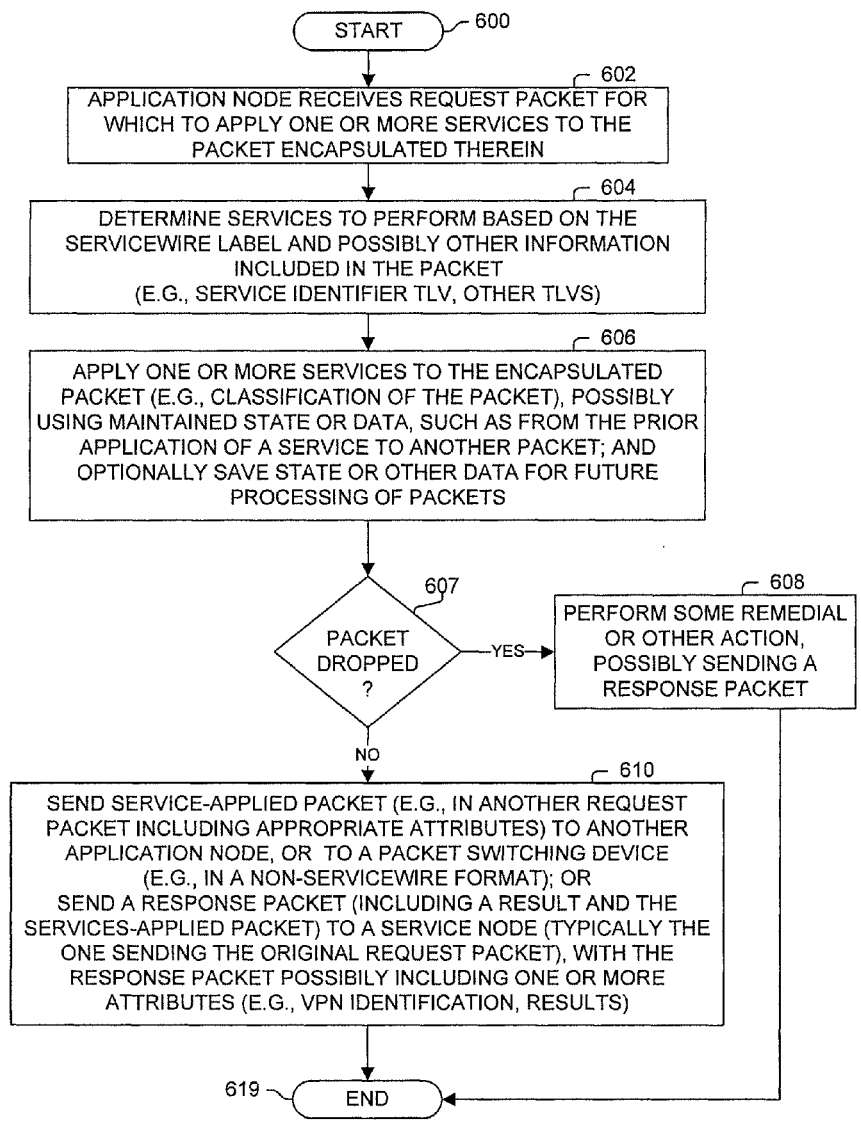
FIG. 6 illustrates a process performed in one embodiment.

FIG. 6 illustrates a process performed, in one embodiment, by an application node for processing a request packet received from a service or application node. Processing begins with process block 600. In process block 602, the application node receives the request packet for which to apply one or more services to the packet encapsulated therein. Typically, the application node is remote from the service node (e.g., communicatively coupled via a network external to the service and application nodes). In one embodiment, the service and application nodes are within a same packet switching appliance, such as with the application node being a blade server or service blade. Next, in process block 604, the application node identifies, based on the ServiceWire label and possibly other information included in the request packet (e.g., in the ServiceWire encapsulation) one or more services to apply to the encapsulated packet.

In process block 606, the application node applies one or more of the identified service(s) to the encapsulated packet. In one embodiment, these services include a classification service such as using deep packet inspection of the encapsulated packet, generating a classification result which can be used in processing the packet and possibly other packets in the same flow of packets. For example, this classification result might identify a QoS level for processing packets in the flow of packets, or it might identify that the flow of packets should be dropped (e.g., they are malicious in nature).

Additionally, in one embodiment, resulting state information or other data from the application of a service to a packet of a packet flow may be maintained by an application node, such as for use in applying a service to other packets especially those of a same packet flow, or for collecting data or statistics, etc. For example, in analyzing a flow of packets (e.g., applying a deep packet inspection service), certain signature or other data may be split among multiple packets of the packet flow. Thus, to appropriately classify the flow, an analysis/classification service is applied to multiple packets of the flow, with the particular classification of the packet flow not known until the last of these multiple packets have been analyzed. In one embodiment, a service or an application node uses this particular classification to process other packets in the packet flow. Note, these packets, after having one or more services applied to them, can be sent to another application node, to a service node, or dropped.

As determined in process block 607, if the packet was dropped, then in process block 608, some remedial or other action is typically taken, which may include sending a response packet to the service node, such that the service node can update its classification mechanism to no longer forward packets of the corresponding packet flow to an application node, and to update its processing of other packets of the corresponding packet flow (e.g., drop or mark for dropping, or other processing).

Otherwise, in process block 610, the services-applied packet (e.g., the original packet or a modification thereof based on the application of one or more services) is sent in a request packet to another application node to apply one or more services; the services-applied packet is sent in a non-ServiceWire format to another packet switching device towards its destination, or the services-applied packet possibly along with a result (e.g., classification or other processing result) is sent in a response packet back to the originating service node. For example, one application node can apply one or more services (e.g., including deep packet inspection) to a packet, with the packet and these results sent to another application node for applying one or more services. The response packet may include one or more attributes or other information, such as, but not limited to, a classification or processing result and/or an identification of a VPN associated with the services-applied packet (e.g., the same or different identifier identifying a VPN in the ServiceWire or other encapsulation of the received request packet). Processing of the flow diagram of FIG. 6 is complete as indicated by process block 619.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
advertising, via Label Distribution Protocol (LDP) by an application node, that the application node is configured to perform one or more packet-processing services and corresponding one or more servicewire labels for accessing said one or more packet-processing services;
receiving, by a packet switching device, one or more packets including information being distributed via said LDP, with said one or more packets including a particular advertisement that the application node is configured to perform a particular packet-processing service of said one or more services and a particular servicewire label of said one or more servicewire labels to use to access the particular packet-processing service;
receiving an original packet,
determining to apply the particular packet-processing service to the original packet;
selecting the application node to apply the particular packet-processing service to the original packet based on the particular advertisement;
sending, by the packet switching device, a request packet to the application node requesting the application of the particular packet-processing service to the original packet, with the original packet being servicewire encapsulated in the request packet, and with the request packet including the particular servicewire label and a servicewire header; and
applying, by the application node, the particular packet-processing service to the original packet; and sending, by the application node to the packet switching device, a servicewire response packet responsive to the packet-processing service said applied by the application node to the original packet, with the servicewire response packet including an encapsulation of a packet-processing services-applied version of the original packet resulting from the packet-processing service said applied by the application node to the original packet.

2. The method of claim 1, wherein the request packet includes a label stack comprising a plurality of labels; wherein the plurality of labels includes the particular servicewire label.

3. The method of claim 1, wherein the particular packet-processing service includes at least one application from a group of applications consisting of:
layer-4, layer-5, layer-6, and layer-7 services.

4. The method of claim 3, wherein the particular packet-processing service includes at least one application from a group of applications consisting of:
Firewall (FW), Network Address Translation (NAT), Network-based Application Recognition (NBAR), deep packet inspection (DPI), authentication, encryption, and Internet Protocol Security (IPsec).

5. The method of claim 4, comprising: establishing a Targeted Label Distribution Protocol (tLDP) session between the application node and the packet switching device; wherein the particular servicewire label is communicated to the packet switching device from the application node over the tLDP session.

6. The method of claim 1, wherein the request packet includes one or more non-label service identification values based on which the particular service can be identified by the application node.

7. A method, comprising:
receiving, by a packet switching device, one or more packets including information being distributed via Label Distribution Protocol (LDP), with said one or more packets including a particular advertisement that one or more packet-processing services are available from an application node and corresponding one or more servicewire labels for accessing said one or more packet-processing services, and including a particular advertisement that the application node is configured to perform a particular packet-processing service of said one or more services and a particular servicewire label of said one or more servicewire labels to use to access the particular packet-processing service;
receiving an original packet,
determining to apply the particular packet-processing service to the original packet;
selecting, by the packet switching device, the application node to apply the particular packet-processing service based on said received advertisement;
sending, by the packet switching device, a request packet to said selected application node requesting the application of the particular packet-processing service to the original packet, with the original packet being servicewire encapsulated in the request packet, and with the request packet including the particular servicewire label and a servicewire header; and
receiving, by the packet switching device, a servicewire response packet responsive to the packet-processing service applied by the application node to the original packet, with the servicewire response packet including an encapsulation of a packet-processing services-applied version of the original packet resulting from the packet-processing service applied by the application node to the original packet.

8. The method of claim 7, wherein the packet-processing service includes at least one application from a group of applications consisting of:
layer-4, layer-5, layer-6, and layer-7 services.

9. The method of claim 8, wherein the particular service includes at least one application from a group of applications consisting of: Firewall (FW), Network Address Translation (NAT), Network-based Application Recognition (NBAR), deep packet inspection (DPI), authentication, encryption, and Internet Protocol Security (IPsec).

10. A packet switching device, comprising:
a plurality of interfaces configured to send and receive packets, including being configured to receive:
one or more packets including information being distributed via Label Distribution Protocol (LDP), with said one or more packets including an advertisement that a packet-processing service is available from an application node and a servicewire label for accessing the packet-processing service; and
an original packet, and
one or more processing elements configured to:
determine to apply the packet-processing service to the original packet;
select the application node to apply the packet-processing service to the original packet based on said received advertisement that the packet-processing service is available from the application node, and
create a request packet to request the packet-processing service be applied by the application node to the original packet, with the original packet being servicewire encapsulated in the request packet, and with the request packet including the servicewire label and a servicewire header;
wherein the packet switching device is configured to send the request packet to the application node to apply the packet-processing service to the original packet encapsulated in the request packet and to receive a servicewire response packet responsive to the packet-processing service applied by the application node to the original packet, with the servicewire response packet including an encapsulation of a packet-processing services-applied version of the original packet resulting from the packet-processing service applied by the application node to the original packet.

11. A method, comprising:
advertising via Label Distribution Protocol (LDP), by an application node, one or more packet-processing services that the application node is configured to perform and corresponding one or more servicewire labels for accessing said one or more packet-processing services, including advertising a particular packet-processing service associated with a particular servicewire label;
receiving, by the application node from a packet switching device, a request packet requesting to apply the particular packet-processing service to an original packet associated with the request packet, with the original packet being servicewire encapsulated in the request packet, and with the request packet including the particular servicewire label and a servicewire header;
applying, by the application node, the particular service to the original packet; and
sending, by the application node to the packet switching device, a servicewire response packet responsive to the particular packet-processing service said applied by the application node to the original packet, with the servicewire response packet including an encapsulation of a packet-processing services-applied version of the original packet resulting from the particular packet-processing service said applied by the application node to the original packet.

12. The method of claim 11, wherein the particular service includes at least one application from a group of applications consisting of:
layer-4, layer-5, layer-6, and layer-7 services.

13. An application node, comprising:
a plurality of interfaces configured to send and receive packets, including being configured:
to advertise, via Label Distribution Protocol, one or more services that the application node is configured to perform and corresponding one or more servicewire labels for accessing said one or more packet-processing services, including advertising a particular packet-processing service associated with a particular servicewire label, and
to receive from a packet switching device a request packet requesting to apply the particular packet-processing service to an original packet associated with the request packet, with the original packet being servicewire encapsulated in the request packet, and with the request packet including the particular servicewire label and a servicewire header;
one or more processing elements configured to apply the particular service to the original packet, and to create a servicewire response packet responsive to the particular packet-processing service said applied by the application node the original packet, with the servicewire response packet including an encapsulation of a packet-processing services-applied version of the original packet resulting from the particular packet-processing service said applied by the application node to the original packet; and
wherein the application node is configured to send the servicewire response packet to the packet switching device.

14. The application node of claim 13, wherein the particular service includes at least one application from a group of applications consisting of: layer-4, layer-5, layer-6, and layer-7 services.

* * * * *

UNITED STATES PATENT AND TRADEMARK OFFICE
CERTIFICATE OF CORRECTION

| | | |
|---|---|---|
| PATENT NO. | : 9,049,099 B2 | Page 1 of 1 |
| APPLICATION NO. | : 12/850952 | |
| DATED | : June 2, 2015 | |
| INVENTOR(S) | : Pignataro et al. | |

It is certified that error appears in the above-identified patent and that said Letters Patent is hereby corrected as shown below:

In the claims,

Col. 16, Claim 13, line 22, "node the original" should read – node to the original –

Signed and Sealed this
Twenty-second Day of December, 2015

Michelle K. Lee
*Director of the United States Patent and Trademark Office*